United States Patent
Wirola et al.

(10) Patent No.: US 10,935,627 B2
(45) Date of Patent: Mar. 2, 2021

(54) IDENTIFYING POTENTIALLY MANIPULATED RADIO SIGNALS AND/OR RADIO SIGNAL PARAMETERS

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/723,802

(22) Filed: Dec. 20, 2019

(65) Prior Publication Data
US 2020/0200859 A1 Jun. 25, 2020

(30) Foreign Application Priority Data
Dec. 20, 2018 (EP) .................................... 18214688

(51) Int. Cl.
*H04W 4/029* (2018.01)
*G01S 5/02* (2010.01)
(Continued)

(52) U.S. Cl.
CPC .......... *G01S 5/0257* (2013.01); *G01S 5/0226* (2013.01); *G01S 5/0284* (2013.01); *H04W 4/80* (2018.02); *H04W 84/12* (2013.01)

(58) Field of Classification Search
CPC .............................. H04W 24/02; H04W 4/029
(Continued)

(56) References Cited

U.S. PATENT DOCUMENTS

| 6,448,925 | B1 | 9/2002 | Shridhara |
| 7,716,740 | B2 | 5/2010 | Robert et al. |

(Continued)

FOREIGN PATENT DOCUMENTS

| CN | 106597363 A | 4/2017 |
| EP | 2 746 813 A1 | 6/2014 |

(Continued)

OTHER PUBLICATIONS

Extended European Search Report for Application No. EP 18 21 4716 dated Jul. 5, 2019, 6 pages.

(Continued)

*Primary Examiner* — William D Cumming
(74) *Attorney, Agent, or Firm* — Alston & Bird LLP

(57) ABSTRACT

A method performed by a mobile device is disclosed that includes obtaining one or more first radio signal parameters of one or more radio signals at a first position of the mobile device and obtaining sensor information indicating a movement of the mobile device from the first position to a second position. The method also includes obtaining one or more second radio signal parameters of the one or more radio signals at the second position of the mobile device and determining, at least partially based on the first radio signal parameters and the sensor information, whether the second radio signal parameters are expected or unexpected for the second position of the mobile device. A corresponding apparatus and computer-readable storage medium are also disclosed.

20 Claims, 5 Drawing Sheets

(51) Int. Cl.
*H04W 4/80* (2018.01)
*H04W 84/12* (2009.01)

(58) Field of Classification Search
USPC .......................................................... 370/252
See application file for complete search history.

(56) References Cited

U.S. PATENT DOCUMENTS

| | | |
|---|---|---|
| 7,970,894 B1 | 6/2011 | Patwardhan |
| 8,571,578 B1 | 10/2013 | Chen et al. |
| 8,655,312 B2 | 2/2014 | Stahlberg et al. |
| 8,750,267 B2 | 6/2014 | Aggarwal et al. |
| 8,805,403 B2 | 8/2014 | Curticapean et al. |
| 9,113,291 B2* | 8/2015 | Venkatraman ........ H04W 4/029 |
| 9,167,386 B2 | 10/2015 | Valaee et al. |
| 9,258,713 B2 | 2/2016 | Rangarajan et al. |
| 9,301,100 B1 | 3/2016 | Jampani et al. |
| 9,374,709 B2 | 6/2016 | Peirce et al. |
| 9,420,430 B2 | 8/2016 | Wuoti et al. |
| 9,466,881 B1 | 10/2016 | Berry et al. |
| 9,503,864 B1 | 11/2016 | Chao et al. |
| 9,544,798 B1 | 1/2017 | Ahmadzadeh et al. |
| 9,794,753 B1 | 10/2017 | Stitt et al. |
| 9,849,978 B1 | 12/2017 | Carmack et al. |
| 9,867,039 B2 | 1/2018 | Wang et al. |
| 9,886,850 B2* | 2/2018 | Benhammou ......... H04L 43/062 |
| 10,149,159 B1 | 12/2018 | Perfitt |
| 10,531,423 B1 | 1/2020 | Hassan et al. |
| 2006/0240840 A1 | 10/2006 | Morgan et al. |
| 2007/0049323 A1 | 3/2007 | Wang et al. |
| 2009/0088132 A1 | 4/2009 | Politowicz |
| 2010/0120422 A1 | 5/2010 | Cheung et al. |
| 2011/0009132 A1 | 1/2011 | Skarby et al. |
| 2011/0065450 A1 | 3/2011 | Kazmi |
| 2011/0131651 A1 | 6/2011 | Shanmugavadivel et al. |
| 2012/0056785 A1 | 3/2012 | Jovicic et al. |
| 2013/0170378 A1 | 7/2013 | Ray et al. |
| 2013/0196684 A1 | 8/2013 | Dong |
| 2013/0252631 A1 | 9/2013 | Alizadeh-Shabdiz et al. |
| 2013/0303185 A1 | 11/2013 | Kim et al. |
| 2013/0310066 A1 | 11/2013 | Shu et al. |
| 2013/0310068 A1 | 11/2013 | Fisher et al. |
| 2013/0336138 A1* | 12/2013 | Venkatraman ........ G01S 5/0278 370/252 |
| 2014/0150049 A1 | 5/2014 | Kwon et al. |
| 2014/0256348 A1 | 9/2014 | Wirola et al. |
| 2015/0050947 A1 | 2/2015 | Wirola et al. |
| 2015/0065166 A1 | 3/2015 | Ward et al. |
| 2015/0215762 A1 | 7/2015 | Edge |
| 2015/0247916 A1 | 9/2015 | Bartov et al. |
| 2015/0351017 A1 | 12/2015 | Wirola et al. |
| 2016/0054427 A1 | 2/2016 | Wirola et al. |
| 2016/0066154 A1 | 3/2016 | Shin |
| 2016/0094947 A1 | 3/2016 | Shen et al. |
| 2016/0192136 A1 | 6/2016 | Pan et al. |
| 2016/0260059 A1 | 9/2016 | Benjamin et al. |
| 2017/0068902 A1 | 3/2017 | Kirshner |
| 2017/0078851 A1 | 3/2017 | Agrawal et al. |
| 2017/0160375 A1 | 6/2017 | Syrjarinne et al. |
| 2017/0311165 A1 | 10/2017 | Kang et al. |
| 2017/0325070 A1 | 11/2017 | Wirola et al. |
| 2017/0343640 A1 | 11/2017 | Khan et al. |
| 2018/0007067 A1 | 1/2018 | Kaushik |
| 2018/0067187 A1 | 3/2018 | Oh et al. |
| 2018/0070239 A1 | 3/2018 | Norrman et al. |
| 2018/0113189 A1 | 4/2018 | Khan et al. |
| 2018/0123708 A1 | 5/2018 | Khalajmehrabadi et al. |
| 2018/0188348 A1 | 7/2018 | Wirola et al. |
| 2018/0219869 A1 | 8/2018 | Kumar et al. |
| 2018/0255430 A1 | 9/2018 | Ivanov et al. |
| 2018/0279067 A1 | 9/2018 | Ivanov et al. |
| 2018/0352585 A1 | 12/2018 | Yang et al. |
| 2019/0150001 A1 | 5/2019 | Jen et al. |
| 2019/0174452 A1 | 6/2019 | Lev et al. |
| 2020/0015096 A1* | 1/2020 | Wirola .................. H04L 41/145 |
| 2020/0112570 A1 | 4/2020 | Yang et al. |
| 2020/0200856 A1 | 6/2020 | Wirola et al. |
| 2020/0200857 A1 | 6/2020 | Wirola et al. |
| 2020/0200858 A1* | 6/2020 | Wirola .................... G06F 16/29 |
| 2020/0200864 A1 | 6/2020 | Wirola et al. |
| 2020/0200865 A1 | 6/2020 | Wirola et al. |
| 2020/0204988 A1 | 6/2020 | Wirola et al. |
| 2020/0205004 A1 | 6/2020 | Wirola et al. |
| 2020/0205005 A1 | 6/2020 | Wirola et al. |

FOREIGN PATENT DOCUMENTS

| | | |
|---|---|---|
| EP | 3 076 582 A1 | 10/2016 |
| EP | 3 410 156 A1 | 12/2018 |
| WO | WO 2015/189161 A1 | 12/2015 |
| WO | WO 2017/100686 A1 | 6/2017 |

OTHER PUBLICATIONS

Extended European Search Report for Application No. EP 18 21 4721 dated Jul. 22, 2019, 7 pages.
Extended European Search Report for Application No. EP 18 21 4705 dated Jul. 5, 2019, 8 pages.
Extended European Search Report for Application No. EP 18 21 4688 dated Jul. 9, 2019, 6 pages.
Extended European Search Report for Application No. EP 18 21 4718 dated Jun. 17, 2019, 9 pages.
Extended European Search Report for Application No. EP 18 21 4720 dated Jul. 15, 2019, 8 pages.
Extended European Search Report for Application No. EP 18 21 4694 dated Jul. 5, 2019, 6 pages.
Extended European Search Report for Application No. EP 18 21 4724 dated Jul. 12, 2019, 9 pages.
U.S. Appl. No. 16/721,311, filed Dec. 19, 2019; In re: Wirola et al. entitled *Enabling Flexible Provision of Signature Data of Position Data Representing an Estimated Position*.
U.S. Appl. No. 16/723,451, filed Dec. 20, 2019; In re: Wirola et al. entitled *Service for Real-Time Spoofing/Jamming/Meaconing Warning*.
U.S. Appl. No. 16/723,572, filed Dec. 20, 2019; In re: Wirola et al. entitled *Stastical Analysis of Mismatches for Spoofing Detection*.
U.S. Appl. No. 16/723,620, filed Dec. 20, 2019; In re: Wirola et al. entitled *Crowd-Sourcing of Potentially Manipulated Radio Signals and/or Radio Signal Paramaters*.
U.S. Appl. No. 16/723,662, filed Dec. 20, 2019; In re: Wirola et al. entitled *Device-Centric Learning of Manipulated Positioning*.
U.S. Appl. No. 16/723,721, filed Dec. 20, 2019; In re: Wirola et al. entitled *Identifying Potentially Manipulated Radio signals and/or Radio Signal Parameters Based on a First Radio Map Information and a Second Radio Map Information*.
U.S. Appl. No. 16/723,768, filed Dec. 20, 2019; In re: Wirola et al. entitled *Identifying Potentially Manipulated Radio Signals and/or Radio Signal Parameters Based on Radio Map Information*.
GPS Spoofing a Growing Problem For Uber [online] [retrieved Feb. 17, 2020]. Retrieved via the Internet: https:/soliddriver.com/GPS-Spoofing-A-Growing-Problem-for-Uber (dated Nov. 10, 2019) 4 pages.
Galileo Commercial Service Implementing Decision enters into force Uber [online] [retrieved Feb. 17, 2020]. Retrieved via the Internet: https://www.gsa.europa.eu/newsroom/news/galileo-commercial-service-implementing-decision-enters-force (dated Feb. 10, 2017) 6 pages.
Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.
Android keystone system 1 Android Developers [online] [retrieved Feb. 17, 2020] Retrieved via the Internet: https://web.archive.org/web/20181212204557/https://developer.android.com/training/articles/keystore (dated Dec. 12, 2018) 17 pages.
Subscriber Identity Module—Wikipedia [online] [retrieved Feb. 17, 2020]. Retrieved via the Internet: https://web.archive.org/web/

(56) References Cited

OTHER PUBLICATIONS

2017092316223/https://fi.wikipedia.org/wiki/Subscriber_Identity_Module (dated Sep. 23, 2017) 2 pages.
Extensible Authentication Protocol—Wikipedia [online] [retrieved Feb. 17, 2020]. Retrieved via the Internet: https://web.archive.org/web/20171209152957/https://en.wikipedia.org/wiki/Extensible_Authentication_Protocol (dated Dec. 9, 2017) 10 pages.
Arkko, J. et al., *Extensible Authentication Protocol Method for 3rdGeneration Authentication and Key Agreement (EAP-AKA)*, RFC4187 (Jan. 2006) 80 pages.
Tang, Z. et al., *Exploiting Wireless Received Signal Strength Indicators to Detect Evil-Twin Attacks in Smart Homes*, Hindawi, Moblie Information systems, vol. 2017, Article ID 1248578 (Jan. 2017) 14 pages.
Enterprise Mobility 8.1 Design Guide—WLAN RF Design Consideration [Cisco 5500 Series Wireless Controllers]—Cisco [online] [retrieved Feb. 25, 2020]. Retrieved via the Internet: https://web.archive.org/web/20170801042321/https://www.cisco/com/c/en/us/td/docs/wireless/controller/8-1/Enterprise-Mobility-8-1-Design-Guide/Enterprise_Mobility_8-1_Deployment_Guide/wlanrf.html (dated Aug. 1, 2017) 46 pages.
Office Action for U.S. Appl. No. 16/723,662 dated Jul. 9, 2020.
Office Action for U.S. Appl. No. 16/723,572 dated Jul. 7, 2020.
Office Action for U.S. Appl. No. 16/723,721 dated Jul. 1, 2020.
Extended European Search Report for Application No. EP 18214714.0 dated Jul. 5, 2019, 6 pages.
Notice of Allowance for U.S. Appl. No. 16/723,721 dated Nov. 16, 2020.
Non-Final Office Action for U.S. Appl. No. 16/723,451 dated Nov. 23, 2020.
Final Office Action for U.S. Appl. No. 16/723,662 dated Dec. 18, 2020.
Final Office Action for U.S. Appl. No. 16/723,572 dated Dec. 8, 2020.

* cited by examiner

IDENTIFYING POTENTIALLY MANIPULATED RADIO SIGNALS AND/OR RADIO SIGNAL PARAMETERS

CROSS-REFERENCE TO RELATED APPLICATIONS

This application claims priority to European Application No. 18214688.6, filed Dec. 20, 2018, the entire contents of which are incorporated herein by reference.

FIELD OF THE DISCLOSURE

The invention relates to the field of non-GNSS based radio positioning and more specifically to identifying potentially manipulated radio signals and/or radio signal parameters.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, radio frequency beacon-based positioning systems such as BLUETOOTH low energy (BLE) based positioning systems, cellular network based positioning systems and wireless local area network (WLAN) based positioning systems.

Such a non-GNSS based radio positioning system (e.g. a self-contained positioning system) may be divided in at least three stages, an installation stage, a training stage and a positioning stage.

In the installation stage, dedicated positioning support radio devices (e.g. BLUETOOTH or other radio frequency beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio devices (e.g. BLUETOOTH or other radio frequency beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. BLUETOOTH or other radio frequency beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EMBODIMENTS OF THE INVENTION

Non GNSS-based radio positioning systems (e.g. BLUETOOTH, WLAN and cellular based radio positioning systems) as disclosed above may be affected by manipulating radio signals that are used for positioning purposes during the positioning stage. Manipulation techniques may for example be spoofing or jamming of such radio signals:

Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic radio signals captured at a different position and/or time. Alternatively, a spoofing malware running on the mobile device may falsify scanning results (e.g. as scanning results obtained radio signal parameters) when the mobile device scans for observable radio signals for estimating its position. Such falsified (i.e. "spoofed") radio signals or scanning results may be used to cause the mobile device to determine its position to be somewhere other than where it actually is.

Jamming of radio signals may be considered to relate a deliberate attempt to disrupt scanning for one or more radio signals by a mobile device, for example by transmitting radio signals and/or radio noise interfering the one or more radio signals.

Such manipulation techniques are a threat to business models which rely on trustworthy positioning like car sharing services. It is inter-alia an object of the present invention to improve the above disclosed non-GNSS based radio positioning systems to enable mitigating the threat associated with such manipulation techniques.

According to an exemplary aspect of the invention, a method performed by a mobile device is disclosed, wherein the method comprises:
- obtaining one or more first radio signal parameters of one or more radio signals at a first position of the mobile device;
- obtaining sensor information indicating a movement of the mobile device from the first position to a second position;
- obtaining one or more second radio signal parameters of the one or more radio signals at the second position of the mobile device;
- determining, at least partially based on the first radio signal parameters and the sensor information, whether the second radio signal parameters are expected or unexpected for the second position of the mobile device.

The disclosed method may serve for identifying potentially manipulated radio signals and/or radio signal parameters.

The mobile device may be an Internet-of-Thing (IoT) device, a smart home device, a smartphone, a tablet computer, a notebook computer, a smart watch, and a smart band.

For example, the disclosed method may be part of a non-GNSS based radio positioning system as disclosed above. The mobile device may be enabled for or support such a non-GNSS based radio positioning system. This may be understood to mean that the mobile device is configured to estimate (e.g. determine) or to cause estimating (e.g. determining) its position at least partially based on radio signal parameters of one or more radio signals (e.g. one or more terrestrial radio signals) obtained at this position (e.g. obtained as a scanning result of scanning for observable radio signals at this position). Estimating (e.g. determining) of a position of the mobile device at least partially based on (a) radio signal parameter(s) may be understood to mean that the estimating is performed as a function of the radio signal parameter(s). It is however to be understood that the estimating may optionally depend on further information like a radio map. For example, such a radio map may be configured to enable mobile devices to estimate their position at least partially based on this radio map when the mobile devices are located in the area covered by the radio map. For example, the radio map is represented by radio map information which may be provided (e.g. transmitted) by a positioning server to the mobile device and/or which may be hold available by the mobile device (e.g. stored in memory means of the mobile device(s)). For example, the radio map contains or represents a respective radio model for a plurality of radio devices transmitting (e.g. broadcasting) radio signals that are observable within the area covered by the radio map. If the radio map covers a building, the radio map may contain or represent, for each floor of the building, a respective radio model for a plurality of radio devices transmitting (e.g. broadcasting) radio signals that are observable on the respective floor of the building.

A respective radio model for a respective radio device of the plurality of radio devices may be understood to represent at least the expected radio coverage of the respective radio device (e.g. on a certain floor of a building). For example, the radio model of such a radio device may describe the coverage area (e.g. on a certain floor of a building) within which radio signals transmitted or triggered to be transmitted by this radio device are expected to be observable. An example for such a radio model is a radio image representing an expected radio signal strength field of the radio signals transmitted or triggered to be transmitted by this radio device. The real radio coverage of such a radio positioning support device may however deviate from the expected radio coverage as described by such a radio model. As disclosed above, the radio map may be determined by the positioning server during the training stage of the non-GNSS based radio positioning system. Causing of estimating (e.g. determining) of a position of a mobile device at least partially based on the radio signal parameter(s) may be understood to mean that the radio signal parameter(s) are provided (e.g. transmitted) by the mobile device to the positioning server to cause the positioning server to estimate (e.g. determine) a position of the mobile device at least partially based on the radio signal parameter(s).

The one or more radio signals may be terrestrial radio signals. Examples of such a terrestrial radio signal are a BLUETOOTH signal, a BLUETOOTH Low Energy (BLE) signal, a cellular network signal, a low-power wide-area network (LPWAN) signal or a Wireless Local Area Network (WLAN) signal. The BLUETOOTH standards are specified by the BLUETOOTH Special Interest Group and are presently available under www.bluetooth.com. A cellular network may for example be mobile phone network like a 2G/3G/4G/5G cellular communication network. The 2G/3G/4G/5G cellular radio communication standards are developed by the 3GPP and presently available under www.3gpp.org. Examples of LPWAN specifications are the LoRaWAN specification developed by the LoRa Alliance and presently available under lora-alliance.org as well as the Narrowband IoT (NB-IoT) specification developed by 3GPP and presently available under www.3gpp.org. WLAN is for example specified by the standards of the IEEE 802.11 family (www.ieee.org).

A radio signal parameter of a certain radio signal may for example be obtained by the mobile device as a scanning result when scanning for observable radio signals at a certain position (e.g. for estimating its position). Therein, a radio signal may be understood to be observable at a certain position if the radio signal is receivable with a minimum quality (e.g. a minimum signal-to-noise ratio and/or a minimum signal power, e.g. at least −90 dbm or −95 dbm) at this position. For example, the mobile device may determine at least one respective radio signal parameter for each radio signal observed when scanning for radio signals at a certain position. The determined radio signal parameters may then for example be obtained as scanning results.

A radio signal parameter of a certain radio signal may be understood to be at least one of (1) an information (e.g. an identifier) contained in the radio signal and (2) a representation (e.g. an indicator or a value) of a physical quantity (e.g. a received signal strengths) of the radio signal. Accordingly, a radio signal parameter may be determined by at least one of (1) extracting information contained in the radio signal and (2) measuring a physical quantity (e.g. a received signal strength) of the radio signal.

For example, the mobile device may scan for observable radio signals at the first position and the second position for estimating its position (e.g. based on a non-GNSS based radio positioning system as disclosed above). The one or more first radio signal parameters and the one or more second radio signal parameters may then be obtained as scanning results. As discussed above, a spoofing malware running on the mobile device may falsify such scanning results.

The obtained first radio signal parameters and the obtained second radio signal parameters may be understood to be authentic radio signal parameters (e.g. determined by the mobile device when scanning for observable radio signals at the first position and the second position, respectively) as well as manipulated (e.g. falsified or spoofed) radio signal parameters (e.g. falsified or generated by a spoofing malware running on the mobile device). Moreover, it is to be understood that at least some of the radio signals observed by the mobile device when scanning for observable radio signals at the first position and the second position, respectively, may be manipulated (e.g. falsified or spoofed) radio signals and, thus, the authentic radio signal parameters may at least partially based on such falsified radio signals.

The one or more first radio signal parameters may be understood to contain, for each radio signal of the one or more radio signals, at least one respective radio signal parameter obtained by the mobile device at the first position (e.g. when scanning for radio signals at the first position); and the one or more second radio signal parameters may be understood to contain, for each radio signal of the one or more radio signals, at least one respective radio signal parameter obtained by the mobile device at the second position (e.g. when scanning for radio signals at the second position).

The first position and the second position are different positions.

The one or more radio signals may be understood to be observable by the mobile device at the first position and the second position. Moreover, it is to be understood that, in addition to the one or more radio signals observable at both the first position and the second position, further one or more radio signals may only be observable at the first position or the second position. Accordingly, the radio signal parameters obtained at the first position and the second position may not be limited to the one or more radio signals observable at both the first position and the second position. However, the first radio signal parameters and the second radio signal parameters may be understood to only refer to radio signal parameters of the one or more radio signals observable at both the first position and the second position. For example, each of the one or more radio signals observable at both the first position and the second position may be understood to be transmitted or triggered to be transmitted by a respective radio device such that it is observable at the first position and the second position.

Sensor information indicating a movement of the mobile device may be any information (e.g. qualitatively or quantitatively) representing an event or change in the environment of the mobile device detected by a sensor that is indicative (e.g. characteristic) for a movement of the mobile device. An event or change in the environment of the mobile device may for example be an event associated with or a change of a physical quantity (e.g. acceleration, orientation, shock, speed, etc.) that is characteristic for a movement of the mobile device.

Obtaining the sensor information may be understood to mean at least one of receiving the sensor information (e.g. from a remote device like a sensor device, an activity tracker or a smartwatch) and determining the sensor information (e.g. by detecting an event or change in the environment of the mobile device by a sensor of the mobile device).

Determining, at least partially based on the first radio signal parameters and the sensor information, whether the second radio signal parameters are expected or unexpected for the second position of the mobile device may be understood to mean that the determining depends on the first radio signal parameters and the sensor information. It is however to be understood that the determining may optionally depend on further information (e.g. further radio signal parameters, a radio map, etc.). For example, the determining may be at least a function of the first radio signal parameters and the sensor information and, optionally, of further information.

The determining may be performed according to predetermined rules (e.g. a predetermined algorithm). The predetermined rules may for example represent at least one of (1) a definition for second radio signal parameters expected for the second position of the mobile device and (2) a definition for second radio signal parameters unexpected for the second position of the mobile device.

The second radio signal parameters of the one or more radio signals may be defined to be unexpected for the second position of the mobile device if the second radio signal parameters represent at least one of (1) an information and (2) a representation of a physical quantity that is not expected to be obtained (e.g. obtained as a scanning result) for the one or more radio signals at the second position. Otherwise, the second radio signal parameters of the one or more radio signals may be defined to be expected for the second position of the mobile device.

For example, such a rule or definition may be based on the assumption that certain information (e.g. an identifier) contained in the one or more radio signals does not change. Thus, it may be expected that the same information (e.g. an identifier) is extracted from the one or more radio signals by the mobile device after moving from the first position to the second position. Accordingly, it may be predetermined that, if sensor information indicating a movement of the mobile device from the first position to the second position have been obtained and the second radio signal parameters do not contain the same information (e.g. an identifier) than the first radio signal parameters, it is determined that the second radio signal parameters are unexpected for the second position of the mobile device. Otherwise, it may be determined that the second radio signal parameters are expected for the second position of the mobile device.

To give another example, such rule or a definition may additionally or alternatively be based on the assumption a certain physical quantity of the one radio signals (e.g. a received signal strength) may change when the mobile device moves from the first position to the second position. Accordingly, it may be predetermined that, if sensor information indicating a movement of the mobile device from the first position to the second position have been obtained and the second radio signal parameters contain one or more different representations of a certain physical quantity of the one radio signals than the first radio signal parameters, it is determined that the second radio signal parameters are expected for the second position of the mobile device. Otherwise, it may be determined that the second radio signal parameters are unexpected for the second position of the mobile device.

It is to be understood that these examples are not limiting. For example, one or more different rules or definitions may be applied alone or in combination.

If spoofing occurs, the one or more radio signals and/or the first radio signal parameters and second radio signal parameters may behave in an unexpected way and, thus, the second radio signal parameters may be determined to be unexpected for the second position of the mobile device. For example, if a malware running on the mobile device falsifies the scanning results, a representation of a certain physical quantity of the one or more radio signals may not change when the mobile device moves from the first position to the second position. Accordingly, if it is determined that the second radio signal parameters are unexpected for the second position of the mobile device, the one or more radio signals and/or the first radio signal parameters and the second radio signal parameters may be considered to be potentially manipulated. The disclosed method allows identifying potentially manipulated radio signals and/or radio signal parameters and, thus, to mitigate threats associated with manipulation techniques like spoofing and jamming.

According to a further exemplary aspect of the invention, an apparatus is disclosed, wherein the apparatus comprises means for performing the steps of any one embodiment of the disclosed method or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) or component(s) for (a) mobile device (s), for example (a) chip(s) or chipset(s). Alternatively, the disclosed apparatus(es) may be (a) mobile device(s). The mobile device may be configured for determining its position based on a non-GNSS based radio positioning system as disclosed above, for example a BLUETOOTH, WLAN, LPWAN or cellular based radio positioning system or a combination thereof.

It is to be understood that the disclosed apparatus(es) may comprise only the disclosed components (e.g. means) or may further comprise one or more additional components (e.g. means). Examples of such additional components are a radio interface (e.g. a receiver, a transmitter and/or a transceiver), a data interface, a user interface (e.g. a touch-sensitive display, a keyboard, a touchpad, a display, etc.), a sensor, etc.

According to a further exemplary aspect of the invention, a positioning system is disclosed which comprises at least one of the disclosed apparatus(es) (e.g. a mobile device) and a positioning server. Optionally, the system may further comprise one or more radio devices transmitting (e.g. broadcasting) the one or more radio signals.

As disclosed above, the positioning server may be configured to receive a plurality of radio fingerprint observation reports during the training stage and to determine a radio map for a predetermined environment at least partially based on the plurality of radio fingerprint observation reports. The positioning server may be further configured to provide the radio map to the at least one apparatus (e.g. the mobile device) to enable the apparatus to estimate (e.g. determine) its position based on radio signals observed at a certain position of the apparatus if the apparatus is located within the predetermined environment.

The positioning server may be part of a plurality of servers (e.g. forming a positioning cloud) or may be represented by such a plurality of servers (e.g. forming a positioning cloud).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor or by a plurality of processors. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method).

The disclosed method, apparatus(es), system, non-transitory computer readable storage medium and computer program code may be for identifying potentially manipulated radio signals and/or radio signal parameters.

In the following, further features and embodiments of these exemplary aspects of the invention will be described.

According to an exemplary embodiment of the invention, the method further comprises at least one of:
  scanning for radio signals (e.g. the one or more radio signals) at the first position, wherein the first radio signal parameters are obtained as a result of the scanning at the first position;
  scanning for radio signals (e.g. the one or more radio signals) at the second position, wherein the second radio signal parameters are obtained as a result of the scanning at the second position.

According to an exemplary embodiment of the invention, the one or more radio signals and/or the first radio signal parameters and the second radio signal parameters are considered to be potentially manipulated if it is determined that the second radio signal parameters are unexpected for the second position of the mobile device.

According to an exemplary embodiment of the invention, the method further comprises one or more of the following, if it is determined that the second radio signal parameters are unexpected for the second position of the mobile device:
  identifying or causing of identifying the one or more radio signals as potentially manipulated;
  identifying or causing of identifying of at least one of (1) the first radio signal parameters and (2) the second radio signal parameters as potentially manipulated;
  rejecting or causing rejecting of at least one of (1) the first radio signal parameters and (2) the second radio signal parameters for estimating (e.g. determining) a position of the mobile device;
  if a position of the mobile device is estimated (e.g. determined) at least partially based on the first radio signal parameter or the second radio signal parameters, identifying or causing of identifying the estimated position as potentially manipulated.

As discussed above, if it is determined that the second radio signal parameters are unexpected for the second position of the mobile device, the one or more radio signals and/or the first radio signal parameters and the second radio signal parameters may be considered as potentially manipulated.

Identifying the one or more radio signals as potentially manipulated may be understood to mean that manipulation information identifying the one or more radio signals as potentially manipulated are stored by the mobile device. Causing of identifying the one or more radio signals as potentially manipulated may be understood to mean that the mobile device provides manipulation information to a remote device (e.g. a positioning server) causing the remote device to identify the one or more radio signals as potentially manipulated.

Similarly, identifying of at least one of (1) the first radio signal parameters and (2) the second radio signal parameters as potentially manipulated may be understood to mean that manipulation information identifying at least one of (1) the first radio signal parameters and (2) the second radio signal parameters as potentially manipulated are stored by the mobile device. Causing of identifying of at least one of (1) the first radio signal parameters and (2) the second radio signal parameters as potentially manipulated may be understood to mean that the mobile device provides manipulation information to a remote device (e.g. a positioning server) causing the remote device to identify at least one of (1) the first radio signal parameters and (2) the second radio signal parameters as potentially manipulated.

Identifying of radio signals and/or radio parameters as potentially manipulated may allow the mobile device and/or other devices to recognize radio signals and/or radio signal parameters which have already been considered as potentially manipulated before. For example, the mobile device or the remote device may maintain a database (e.g. a black list) for storing (e.g. collecting) manipulation information identifying radio signals and/or radio signal parameters as potentially manipulated.

Rejecting at least one of (1) the first radio signal parameters and (2) the second radio signal parameters for estimating (e.g. determining) a position of the mobile device may be understood to mean that the rejected radio signal parameters are not used for estimating (e.g. determining) a position of the mobile device. In case the position of the mobile device is estimated (e.g. determined) by a remote device (e.g. a positioning server), the mobile device may provide manipulation information to the remote device causing the remote device to reject at least one of (1) the first radio signal parameters and (2) the second radio signal parameters for estimating (e.g. determining) a position of the mobile device. This has the effect that only radio signal parameters which are considered to be trustworthy (i.e. not potentially manipulated) are used for estimating (e.g. determining) a position of the mobile device.

Identifying an estimated (e.g. determined) position as potentially manipulated may be understood to mean that manipulation information identifying the estimated position as potentially manipulated are stored by the mobile device. For example, the manipulation information may be stored together or may be part of position information representing the estimated position (e.g. in the form of positioning coordinates). In case the position of the mobile device is estimated (e.g. determined) by a remote device (e.g. a positioning server), the mobile device may provide manipulation information to the remote device causing the remote device to identify the estimated (e.g. determined) position as potentially manipulated. By identifying the estimated position as potentially manipulated, the potential manipulation can be considered when further processing the estimated position. For example, business services or applications which rely on trustworthy positioning like car sharing services may not use estimated positions identified as potentially manipulated. Other business services or applications may however consider estimated position identified as potentially manipulated.

According to an exemplary embodiment of the invention, the method further comprises one or more of the following, if it is determined that the second radio signal parameters are expected for the second position of the mobile device:
  estimating (e.g. determining) or causing of estimating (e.g. determining) of a position of the mobile device at least partially based on at least one of the first radio signal parameters and the second radio signal parameters;
  determining or causing of determining a radio map at least partially based on the first radio signal parameters or the second radio signal parameters;
  if a position of the mobile device is estimated (e.g. determined) at least partially based on the first radio signal parameters or the second radio signal parameters, identifying or causing of identifying the estimated position as trustworthy.

As discussed above, if it is determined that the second radio signal parameters are expected for the second position of the mobile device, the first radio signal parameters and the second radio signal parameters may be considered to be trustworthy.

Estimating (e.g. determining) of a position of the mobile device at least partially based on radio signal parameters considered as trustworthy may have the effect that the estimated position may be considered as well as trustworthy.

For example, the first radio signal parameters and/or second radio signal parameters may be part of radio fingerprint observation reports determined by the mobile device for determining the radio map. As disclosed above, the radio map may be determined during the training stage of a non-GNSS based radio positioning system. For example, the mobile device may determine the radio map (e.g. generate a radio map or update an existing radio map) at least partially based on these radio fingerprint observation reports. Alternatively or additionally, the mobile device may provide these radio fingerprint observation reports to a remote device (e.g. the positioning server) to cause the remote device to determine the radio map (e.g. generate a radio map or update an existing radio map) at least partially based on these radio fingerprint observation reports. Determining the radio map based on radio signal parameters considered as trustworthy may have the effect that the radio map may be considered as well as trustworthy.

Identifying an estimated (e.g. determined) position as trustworthy may be understood to mean that trust information identifying the estimated position as trustworthy are stored by the mobile device. For example, the trust information may be stored together or may be part of position information representing the estimated position (e.g. in the form of positioning coordinates). In case the position of the mobile device is estimated (e.g. determined) by a remote device (e.g. a positioning server), the mobile device may provide trust information to the remote device causing the remote device to identify the estimated (e.g. determined) position as trustworthy. By identifying the estimated position as trustworthy, the trustworthiness can be considered when further processing the estimated position. For example, business services or applications which rely on trustworthy positioning like car sharing services may only use estimated positions identified as trustworthy. Other business services or applications may however consider estimated positions even if they are not considered as trustworthy (e.g. potentially manipulated).

According to an exemplary embodiment of the invention, the first radio signal parameters and the second radio signal parameters comprise or represent one or more of the following radio signal parameters:
- an identifier of a radio signal;
- a received signal strength parameter;
- a signal-to-noise ratio parameter;
- a signal quality parameter.

An identifier of a radio signal may be understood to mean information contained in an observable radio signal which is configured to enable identifying the radio signal and/or distinguishing the radio signal from other radio signals. An example for such an identifier of a radio signal is an identifier of a radio device transmitting the radio signal like a like a name, an address (e.g. a MAC address or an IP address), an universally unique identifier (UUID), a service set identifier (SSID), a basic service set identifier (BSSID), or a combination thereof. For example, the identifiers of the one or more radio signals may be obtained by extracting the identifiers from the one or more radio signals when scanning for observable radio signals at the first position and the second position.

A signal quality parameter may be understood to mean information indicating the reception quality of an observable radio signal. Examples of such signal quality parameters are a received signal strength parameter and a signal-to-noise ratio parameter.

A received signal strength parameter may represent the receiving power of an observed radio signal. In other words, the received signal strength parameter may represent the receiving power of a radio signal observed by the mobile device when scanning for observable radio signals. For example, the mobile device may measure the receiving power of a radio signal observed by the mobile device when scanning for observable radio signals. An example, of a received signal strength parameter is a received signal strength indicator (RSSI) or a physical receiving power level (e.g. a Rx power level) in dBm.

A signal-to-noise ratio parameter may represent a ratio of the receiving power of an observed radio signal and the receiving power of observed background noise. For example, when scanning for observable radio signals, the mobile device may measure the receiving power of a radio signal observed by the mobile device and the receiving power of the background noise observed by the mobile device. An example, of a signal-to-noise ratio parameter is a value representing the ratio of the receiving power of an observed radio signal and the receiving power of observed background noise in dB.

For example, the first radio signal parameters and the second radio signal parameters comprise or represent, for each of the one or more radio signals, one or more respective radio signal parameters of these radio signal parameters.

According to an exemplary embodiment of the invention, the determining whether the second radio signal parameters are expected or unexpected for the second position of the mobile device comprises:
- determining whether the first radio signal parameters and the second radio signal parameters indicate a change of the one or more radio signals between the first position and the second position.

For example, the change of the one or more radio signals indicated by the first radio signal parameters and the second radio signal parameters may be a change of a physical quantity of the one or more radio signals represented by the first radio signal parameters and the second radio signal parameters.

As disclosed above, it may be assumed that a certain physical quantity of the one radio signals changes when the mobile device moves from the first position to the second position. For example, it may be determined that, if it is determined that the first radio signal parameters and the second radio signal parameters do not indicate such a change, the second radio signal parameters are unexpected for the second position of the mobile device. This may for example be the case, if the first radio signal parameters and/or the second radio signal parameters were falsified by a spoofing malware running on the mobile. For example, the spoofing malware may replace radio signal parameters obtained as a result of scanning for observable radio signals by predetermined radio signal parameters irrespective of the scanning position to deceive the mobile device to cause it to determine that it is located at a position different than the actual scanning position. Such manipulated (e.g. falsified) radio signal parameters may thus not change at all even if the mobile device moves from the first position to the second position.

Furthermore, if the one or more radio signals are at least two different radio signals and if the first radio signal parameters and the second radio signal parameters indicate that the at least two radio signals change equally between the first position and the second position, it may be determined that the second radio signal parameters are unexpected for the second position of the mobile device. This may for example be the case, if the at least two different radio signals are expected to be transmitted by different radio devices, but are transmitted (e.g. retransmitted) by the same spoofing radio device instead. For example, the at least two different radio signals may be expected to be transmitted or to be triggered to be transmitted by different radio devices if the at least two different radio signals contain different identifiers. For example, the at least two radio signals were originally transmitted by at least two different radio devices and may be observable in a certain area. The at least two radio signals may have been captured in this certain area and may now be retransmitted by the spoofing radio device in a different area to deceive the mobile device to cause it to determine that it is located near the at least two different radio devices originally transmitting the at least two radio signals.

For example, the determining whether the second radio signal parameters are expected or unexpected for the second position of the mobile device may further comprise:
- determining or estimating at least one of (1) a distance between the first position and the second position and (2) a direction of movement from the first position to the second position, and
- determining, at least partially based on the at least one of (1) the distance and (2) the direction of movement, whether the change of the one or more radio signals between the first position and the second position is expected or unexpected.

For example, the change of the one or more radio signals between the first position and the second position is an attenuation of the one or more radio signals between the first position and the second position. An attenuation of a radio signal may be understood to relate to path loss of the radio signal resulting in a decrease of the receiving power of the radio signal as it propagates through space. Under free space conditions, the path loss of a radio signal may be calculated in decibels (dB) by the following formula:

$$L = L(d_0) + 10n\log_{10}\left(\frac{d}{d_0}\right)$$

where L is the path loss in decibels, n is the pathloss exponent, $d_0$ the reference distance and d is the distance or the length of the path.

As apparent from the above formula, the free space path loss given in dB is proportional to the distance of the path with a proportionality coefficient of 1. Accordingly, if the attenuation of the one or more radio signals between the first position and the second position given in dB is not proportional to the distance between the first position and the second position with a proportional coefficient equal to or greater than 1, it may be determined that the second radio signal parameters are unexpected for the second position of the mobile device.

Alternatively or additionally, it may be determined that the second radio signal parameters are unexpected for the second position of the mobile device if the direction of movement indicates that the mobile devices moves closer to a radio device transmitting one radio signal of the one or more radio signals, whereas the attenuation of the one or more radio signals indicates that the mobile devices moves away from the radio device transmitting this radio signal of the one or more radio signals.

As disclosed above, the mobile device may hold available radio map information. For example, the radio map may represent the installation positions of a plurality of radio devices transmitting (e.g. broadcasting) radio signals that are observable within the area covered by the radio map.

As disclosed in more detail below, the distance between the first position and the second position and/or the direction of movement from the first position to the second position may be determined or estimated at least partially based on the obtained sensor information.

According to an exemplary embodiment of the invention, the determining whether the second radio signal parameters are expected or unexpected for the second position of the mobile device is further based on a radio map.

According to an exemplary embodiment of the invention, wherein the sensor information is determined by at least one of the following sensors:

a GNSS sensor;
an inertial or motion sensor;
an optical sensor.

A GNSS sensor may be a GPS sensor and/or a Galileo sensor. Sensor information determined by a GNSS sensor may represent or contain GNSS position information (e.g. GNSS position coordinates) of the mobile device. For example, the GNSS position information may represent GNSS positions which are/were subsequently determined when the mobile device is/was moving from the first position to the second position. Based on such subsequently determined GNSS positions, the direction of the movement from the first position to the second position as well as the distance between the first position and the second position may be determined or estimated. For example, it may be assumed for determining or estimating the direction of the movement and/or the distance between the first position and the second position that the first GNSS position determined when moving from the first position to the second position corresponds to the first position and that the last GNSS position determined when moving from the first position to the second position corresponds to the second position.

Examples of an inertial or motion sensor are a speed sensor, an acceleration sensor, a shock sensor, an activity or step sensor, an orientation sensor (e.g. a compass or a gyroscope). Sensor information determined by an inertial or motion sensor may represent or contain inertial or motion information. Based on such information, the travel direction as well as the travel distance of the mobile device may be determined or estimated.

For example, distance is a function of speed and time. Accordingly, a speed profile or acceleration profile of the mobile device which is/was determined by a speed sensor or acceleration sensor when the mobile device is/was moving from the first position to the second position may be used in combination with the travelling time lapsed when the mobile device is/was moving from the first position and the second position to determine or estimate the distance between the first position and the second position. Alternatively or additionally, an activity profile (e.g. a step count) which is/was determined by an activity sensor (e.g. a step sensor) when the mobile device is/was moving from the first position to the second position may be used alone or in combination with further information (e.g. at least one of a speed profile or an acceleration profile of the mobile device or a travelling time lapsed when the mobile device) to determine or estimate the distance between the first position and the second position. For example, it may be assumed that the travel distance of the mobile device when moving from the first position to the second position corresponds to the real distance between the first position and the second position.

Moreover, the travel direction of the mobile device may be determined or estimated based on sensor information determined by an orientation sensor like a compass or a gyroscope when the mobile device is/was moving from the first position to the second position. For example, it may be assumed that the overall travel direction (e.g. the sum of motion vectors) of the mobile device when moving from the first position to the second position corresponds to the direction of movement from the first position to the second position.

An example of an optical sensor may be a camera. Sensor information determined by a camera may represent image information. Based on image information (e.g. representing one or more still images or one or more videos) determined (e.g. captured) by a camera when the mobile device is/was moving from the first position to the second position, the travel distance and/or the travel direction of the mobile device may be determined or estimated by use visual odometry.

As disclosed above, sensor information determined by one or more of these sensors may be used for determining or estimating a direction of movement from the first position to the second position and a distance between the first position and the second position. In particular, sensor information determined by a plurality of sensors may be used for determining or estimating the direction of movement from the first position to the second position and a distance between the first position and the second position. It is however to be understood that the real direction of movement and the real distance may deviate from an accordingly determined or estimated direction of movement or distance.

According to an exemplary embodiment of the invention, the one or more radio signals comprise one or more of the following radio signals:

a BLUETOOTH radio signal (e.g. a BLUETOOTH Low Energy (BLE) radio signal);
a WLAN radio signal;
an LPWAN radio signal;
a cellular radio signal.

Accordingly, the one or more radio devices transmitting (e.g. broadcasting) the one or more radio signals comprise one or more of the following radio devices:
a BLUETOOTH beacon (e.g. a BLUETOOTH beacon enabling BLUETOOTH low energy mode or a BLUETOOTH low energy beacon);
an access point of a wireless local area network;
an access point of a low-power wide area network; and
a cellular network node.

The BLUETOOTH beacons may comprise a BLUETOOTH and/or BLE radio interface, which includes at least a BLUETOOTH and/or BLE transmitter. The BLUETOOTH and/or BLE transmitter may also be a part of a BLUETOOTH and/or BLE transceiver. The BLUETOOTH and/or BLE radio interface may be configured to transmit BLUETOOTH and or BLE radio signals. A BLUETOOTH or other radio frequency beacon that is employed for the invention may be any kind of BLUETOOTH or other radio frequency beacon complying with any present or future standard. The BLUETOOTH standards are specified by the BLUETOOTH Special Interest Group and are presently available under www.bluetooth.com.

Such BLUETOOTH or other radio frequency beacons may be easily installed as dedicated position support radio devices at various installation positions and require little to no maintenance. For example, a plurality of BLUETOOTH or other radio frequency beacons may be easily distributed across a certain area and may cover a certain area (e.g. the area of the environment represented by the radio map and/or of the above disclosed system) with BLUETOOTH radio signals transmitted (e.g. broadcasted) by the BLUETOOTH beacons. Also, BLUETOOTH technologies are supported by many mobile devices by default such as most smartphones, most tablet computers, most notebook computers, most smart watches and most smart bands, etc. Using BLUETOOTH beacons, other radio frequency beacons, and/or BLE beacons may thus have the effect that many mobile devices may use such non-GNSS based radio positioning system without any adaptation of hardware. As a result, the approach may be globally scalable and have low maintenance and deployment costs. In addition, regarding positioning utilizing received signal strength the end-user experience may be acceptable with these technologies, since a horizontal positioning accuracy of 2 to 3 meters as well as a high reliability in floor detection may be achieved. The BLUETOOTH or other radio frequency beacons may be stand-alone devices or be integrated into or attached to some other device. BLUETOOTH or other radio frequency beacons, in particular in low energy mode, require comparably little energy and the use of BLUETOOTH or other radio frequency low energy may enable a positioning with limited energy consumption at all involved devices.

It is to be understood, however, that other types of radio devices than variations of BLUETOOTH or other radio frequency beacons may be used as well as dedicated position support radio devices, for instance tags or other devices that are configured to transmit ultra-wideband (UWB) signals or any wireless radio signals that might emerge in the future.

As disclosed above, existing radio devices like WLAN access points or cellular network nodes may be used as positioning support radio devices alternatively or additionally.

A WLAN access point may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (www.ieee.org).

An LPWAN access point may comprise an LPWAN radio interface, which for example includes an LPWAN transceiver. The LPWAN radio interface may be configured to transmit and/or receive LPWAN radio signals. Accordingly, the radio signal transmitted by such an access point of an LPWAN may be an LPWAN radio signal. Examples of LPWAN specifications are the LoRaWAN specification developed by the LoRa Alliance and presently available under lora-alliance.org as well as the Narrowband IoT (NB-IoT) specification developed by 3GPP and presently available under www.3gpp.org.

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal. The 2G/3G/4G/5G cellular radio communication standards are developed by the 3GPP and presently available under www.3gpp.org.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
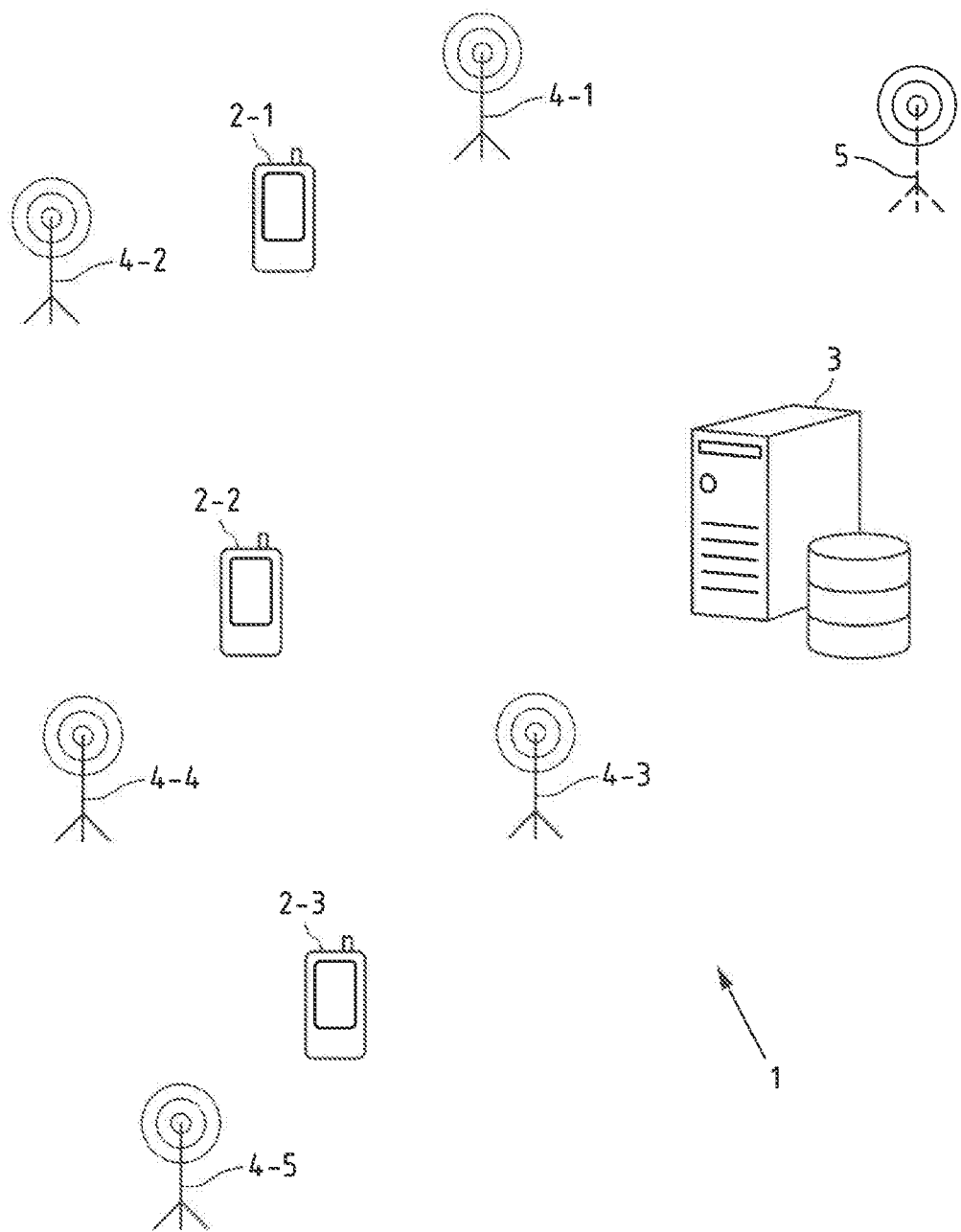
FIG. 1 is a block diagram of an exemplary embodiment of a system according to the invention.

FIG. 1 is a schematic high-level block diagram of a system 1 according to an exemplary aspect of the invention. For exemplary purposes and without limiting the scope of the invention, it is assumed in the following that system 1 is a non-GNSS based radio positioning system for a predetermined environment like a building or a complex of buildings (e.g. a shopping center, a parking garage, an airport, a company site, etc).

For example, each of mobile devices 2-1 to 2-3 may be one of a smartphone, a tablet computer, a notebook computer, a smart watch and a smart band. Mobile devices 2-1 to 2-3 may be enabled for or support non-GNSS based radio positioning system 1.

System 1 comprises a positioning server 3 and a plurality of optional radio devices 4-1 to 4-5.

System 1 is not limited to a single positioning server 3, but may optionally comprise a plurality of servers (e.g. forming a server cloud). Accordingly, positioning server 3 may be part of such a plurality of servers (e.g. a server cloud) or may be represented by such a plurality of servers (e.g. a server cloud).

For exemplary purposes and without limiting the scope of the invention, it is assumed in the following that radio devices 4-1 to 4-5 are dedicated position support radio devices in the form of BLE beacons 4-1 to 4-5 fixedly installed in the predetermined environment of system 1. However, system 1 may comprise further radio devices or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio devices 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio devices 4-1 to 4-5 transmitting the respective radio signal containing this positioning support information.

In the training stage of system 1, mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to positioning server 3 for determining a radio map.

For example, the radio map may be configured to enable mobile devices 2-1 to 2-3 to estimate their position at least partially based on this radio map when the mobile devices are located within the predetermined environment of system 1 (i.e. the area covered by the radio map). For example, the radio map is represented by radio map information which may be provided (e.g. transmitted) by a positioning server 3 to mobile devices 2-1 to 2-3 and/or which may be held available by mobile device 2-1 to 2-3 (e.g. stored in a memory of mobile devices 2-1 to 2-3). For example, the radio map contains or represents a respective radio model for each of BLE beacons 4-1 to 4-5. Moreover, the radio map may represent the respective installation position of each of BLE beacons 4-1 to 4-5. As disclosed above, a respective radio model for a respective BLE beacon of BLE beacons 4-1 to 4-5 may be understood to represent at least the expected radio coverage of the respective radio device. For example, the radio model of such a BLE beacon may at least describe the coverage area within which radio signals transmitted by this radio device are expected to be observable.

In the positioning stage, mobile devices 2-1 to 2-3 may use the radio map to determine their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example determine (e.g. estimate) by use of the radio map that its presents position is within the overlapping region of the coverage areas described by the radio models of BLE beacons 4-1, 4-2 an 4-3.

As discussed above, non GNSS-based radio positioning systems like system 1 may be affected by manipulating radio signals that are used for positioning purposes during the positioning stage. Manipulation techniques may for example be spoofing or jamming of such radio signals as described above in more detail. For example, an attacker may install a spoofing radio device 5 in a certain area to deceive mobile devices 2-1 to 2-3 to cause them to determine to be located within the overlapping region of the coverage areas described by the radio models of BLE beacons 4-1, 4-2 an 4-3. The spoofing radio device 5 may be configured to (e.g. automatically and/or repeatedly) transmit spoofed BLE radio signals containing or representing the UUIDs of BLE beacons 4-1, 4-2 an 4-3. If mobile devices 2-1 to 2-3 determine their position at least partially based on radio signal parameters of these spoofed BLE radio signals, they may determine (e.g. estimate) their position to be within the overlapping region of the coverage areas described by the radio models of BLE beacons 4-1, 4-2 an 4-3 even though they may be located in an entirely different area.

As disclosed in more detail below with respect to FIG. 5, this threat may be mitigated by the disclosed method.

Figure 2:
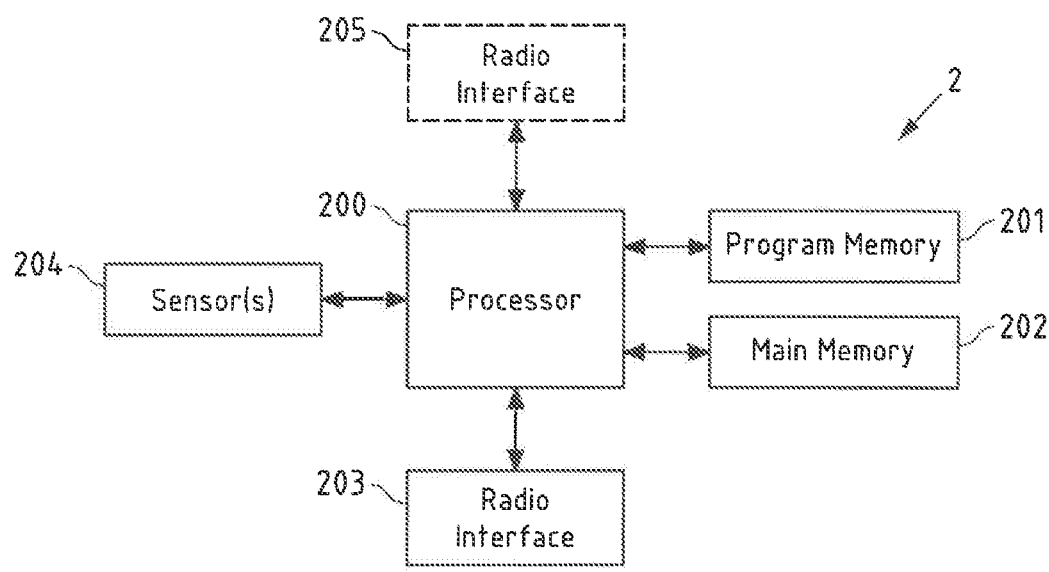
FIG. 2 is a block diagram of an exemplary embodiment of a mobile device according to the invention.

FIG. 2 is a block diagram of an exemplary embodiment of mobile device 2 according to the invention. In the following, it is assumed that mobile devices 2-1 to 2-3 of FIG. 1 corresponds to this mobile device 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code causing mobile device 2 to perform any one embodiment of the disclosed method (e.g. the steps of any one embodiment of the disclosed method) or a part thereof (e.g. at least some steps of any one embodiment of the disclosed method) (as for instance further described below with reference to FIG. 5), when executed on processor 200), and interfaces with a main memory 202. Program memory 201 may also contain an operating system for processor 200 and radio map information representing a radio map of the predetermined environment of system 1. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a radio interface 203 configured for receiving and, optionally, transmitting radio signals. A radio interface may be or may comprise a radio receiver circuit and/or a radio transmitter circuit and/or a radio transceiver circuit. Such circuits may comprise modulators, filters, mixers, switches and/or one or more antennas to allow transmission and/or reception of radio signals.

In the following, it is assumed for exemplary purposes that radio interface 203 is a BLE transceiver configured to transmit and receive BLE radio signals in line with any current or future version of the BLUETOOTH or other radio frequency standard supporting a low energy mode. Radio interface 203 enables mobile device 2 to scan for observable BLE radio signals transmitted (e.g. broadcasted) by BLE beacons 4-1 to 4-5 of system 1. Therein, a BLE radio signal may be understood to be observable if the BLE radio signal is receivable with a minimum quality (e.g. a minimum signal-to-noise ratio and/or a minimum signal power, e.g. at least −90 dBm or −95 dBm). Moreover, the BLE transceiver is configured, alone or together with processor 200, to determine one or more radio signal parameters of BLE radio signals observed (e.g. received) when scanning for observable radio signals. To this end, the BLE transceiver may for example extract, from each observed BLE radio signal, the respective UUID contained therein and measure the respective received signal strength of each observed BLE radio signal. The extracted UUIDs and the received signal strength values may then for example be provided to processor 200 as scanning results. It is to be understood that any computer program code required for receiving and processing received BLE radio signals may be stored in an own memory of the radio interface 203 and executed by an own processor of the radio interface 203 or it may be stored for example in memory 202 and executed for example by processor 200.

Moreover, processor 200 controls one or more sensors 204 configured for determining sensor information indicating a movement of mobile device 2. The determined sensor information may be provided to processor 200. Therein, sensor information indicating a movement of the mobile device may be any information (e.g. qualitatively or quantitatively) representing an event or change in the environment of mobile device 2 detected by a sensor that is indicative (e.g. characteristic) for a movement of mobile device 2. An event or change in the environment of mobile device 2 may for example be an event associated with or a change of a physical quantity (e.g. acceleration, orientation, shock, speed, etc.) that is characteristic for a movement of mobile device 2.

Examples of sensors 204 are a GNSS sensor (e.g. a GPS sensor and/or a Galileo sensor), an inertial or motion sensor (e.g. a speed sensor, an acceleration sensor, a shock sensor, an activity or step sensor, an orientation sensor like a compass or a gyroscope), an optical sensor (e.g. a camera), or a combination thereof.

Processor 200 further controls an optional radio interface 205 configured to communicate via a cellular radio network (e.g. to transmit and receive cellular radio signals). For example, radio interface 205 may be or may comprise a 2G/3G/4G/5G radio transceiver. Mobile device 2 may use radio interface 205 to communicate with positioning server 3 of system 1 (e.g. via the internet). For example, mobile device 2 may use radio interface 205 to transmit radio fingerprint observation reports to positioning server 3 and/or receive radio map information from positioning server 3.

The components 201 to 205 of mobile device 2 may for instance be connected with processor 200 by means of one or more serial and/or parallel busses.

It is to be understood that mobile device 2 may comprise various other components like a user interface for receiving user input.

Figure 3:
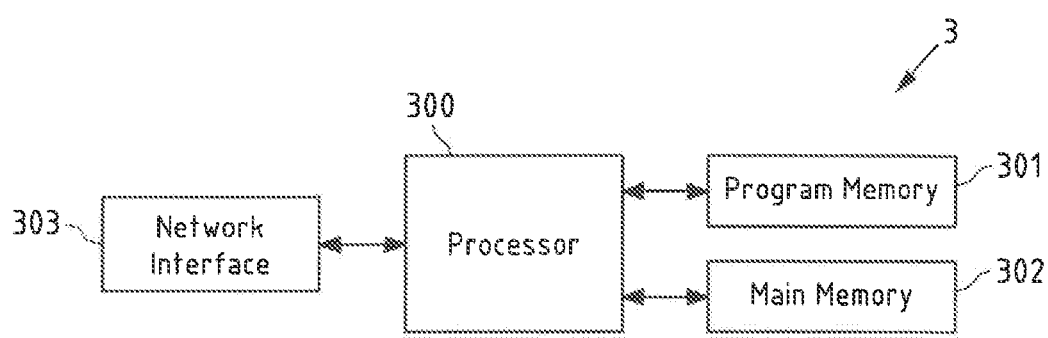
FIG. 3 is a block diagram of an exemplary embodiment of a positioning server according to the invention.

FIG. 3 is a block diagram of an exemplary embodiment of positioning server 3 according to the invention. In the following, it is assumed that positioning server 3 of system 1 of FIG. 1 corresponds to this positioning server 3.

Positioning server 3 comprises a processor 300. Processor 300 may represent a single processor or two or more processors, which are for instance at least partially coupled, for instance via a bus. Processor 300 executes a computer program code stored (e.g. computer program code causing positioning server 3 to determine a radio map of the predetermined environment of system 1 based on radio fingerprint observation reports collected by mobile devices like mobile devices 2-1 to 2-3) in program memory 301, and interfaces with a main memory 302. Program memory 301 may also contain an operating system for processor 300 and radio map information representing a radio map of the predetermined environment system 1. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a network interface 303 which is configured to communicate via a communication network (e.g. the internet). Positioning server 3 may use network interface 303 to communicate with mobile devices 2-1 to 2-3 of FIG. 1 (e.g. via the internet). For example, positioning server 3 may use network interface 303 to receive radio fingerprint observation reports from mobile devices 2-1 to 2-3 and/or transmit radio map information to mobile devices 2-1 to 2-3.

The components 301 to 303 of positioning server 3 may for example be connected with processor 300 by means of one or more serial and/or parallel busses.

It is to be understood that positioning server 3 may comprise various other components like a user interface for receiving user input.

Figure 4:
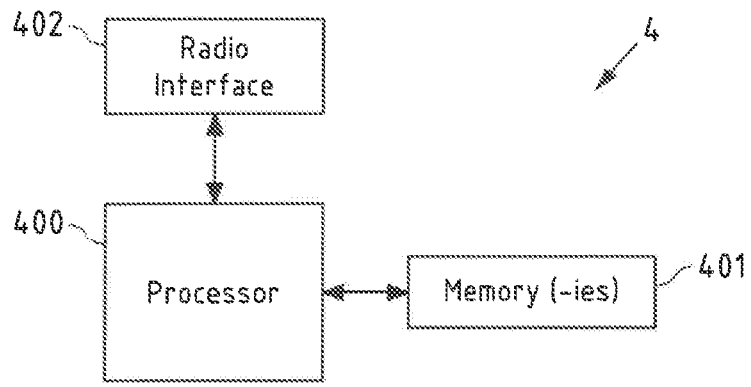
FIG. 4 is a block diagram of an exemplary embodiment of a radio device according to the invention.

FIG. 4 is a block diagram of an exemplary embodiment of a radio device 4 according to the invention. In the following, it is assumed that this radio device 4 is a BLE beacon and corresponds to BLE beacons 4-1 to 4-5 of system 1.

BLE beacon 4 comprises a processor 400. Processor 400 may represent a single processor or two or more processors, which are for instance at least partially coupled, for instance via a bus. Processor 400 executes a program code stored in memory(-ies) 401. Memory(-ies) 401 may also comprise an operating system for processor 400. Memory(-ies) 401 may for instance comprise a first memory portion that is fixedly installed in BLE beacon 4, and a second memory portion that is removable from beacon 4, for instance in the form of a removable SD memory card. Some or all of memory(ies) 401 may also be included into processor 400. Memory(ies) 401 may for instance be a volatile or non-volatile memory. It may for instance be a RAM or DRAM memory. It may for instance be a FLASH memory (or a part thereof), any of a ROM, PROM, EPROM, EEPROM, MRAM or a FeRAM (or a part thereof) and/or a hard disc (or a part thereof), to name but a few examples. It may for instance be used as a working memory for processor 400 when executing an operating system and/or computer program code.

Processor 400 further controls a radio interface 402 configured to receive and/or transmit BLE radio signals. For instance, radio interface 402 may at least comprise a BLE transmitter. The radio interface 402 may additionally comprise a BLE receiver. The transmitter and receiver may also be part of a BLE transceiver. The BLE transmitter enables BLE beacon 4 to transmit BLE radio signals in line with any current or future version of the BLUETOOTH or other radio frequency standard supporting a low energy mode. For example, the BLE transmitter may be configured to automatically and repeatedly transmit BLE radio signals like an advertisement signal. As disclosed above in more detail, such a BLE radio signal may contain and/or represent positioning support information (e.g. a UUID of BLE beacon 4). Likewise, the BLE receiver enables BLE beacon 4 to receive BLE radio signals in line with any current or future version of the BLUETOOTH or other radio frequency standard supporting a low energy mode.

The components 401 to 402 of BLE beacon 4 may for example be connected with processor 400 by means of one or more serial and/or parallel busses.

It is to be understood that BLE beacon 4 may comprise various other components.

Figure 5:
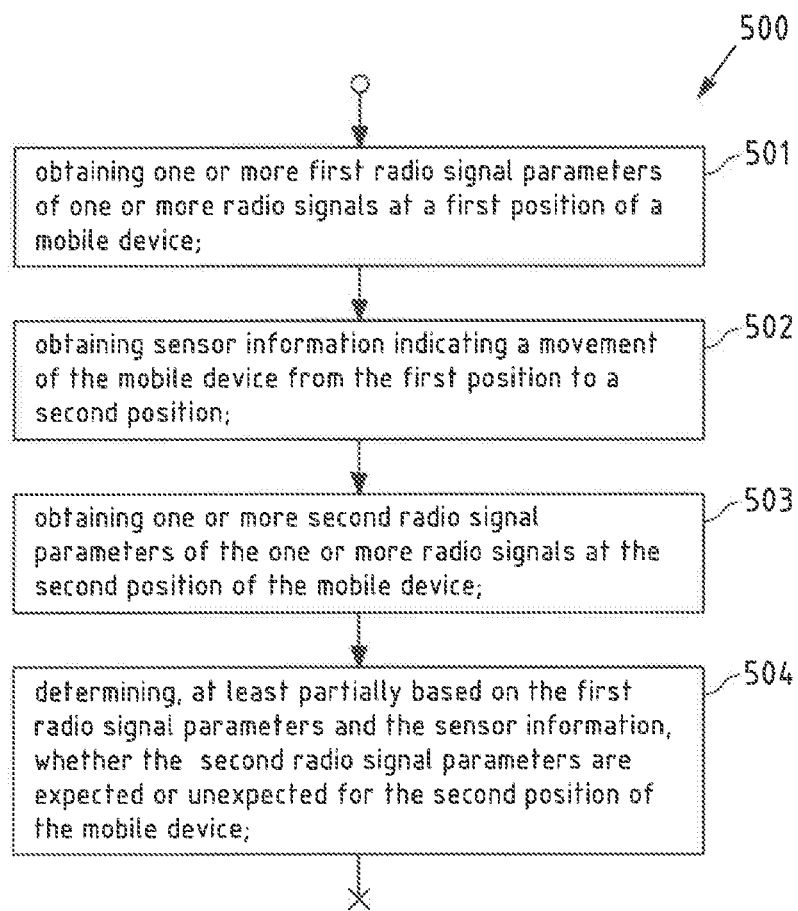
FIG. 5 is a flow chart illustrating an exemplary embodiment of a method according to the invention.

FIG. 5 is a flow chart 500 illustrating an exemplary embodiment of a method according to the invention. Without limiting the scope of the invention, it is assumed in the following that mobile device 2-1 as described above with respect to FIG. 1 performs the steps of flow chart 500.

In a step 501, one or more first radio signal parameters of one or more radio signals are obtained at a first position of mobile device 2-1.

As disclosed above in more detail, the first radio signal parameters may be obtained as scanning results from radio interface 203 when scanning for observable BLE radio signals at the first position of mobile device 2-1 in step 501. In the following, it is assumed that the first radio signal parameters contain or represent, for each observed BLE radio signal, a respective UUID and a respective received signal strength value.

In a step 502, sensor information indicating a movement of mobile device 2-1 from the first position to a second position is obtained.

The sensor information may be determined by one or more of sensors 204 in step 502. Therein, sensor information indicating a movement of mobile device 2-1 may be any information (e.g. qualitatively or quantitatively) representing an event or change in the environment of the mobile device detected by a sensor that is indicative (e.g. characteristic) for a movement of mobile device 2-1. An event or change in the environment of mobile device 2-1 may for example be an event associated with or a change of a physical quantity (e.g. acceleration, orientation, shock, speed, etc.) that is characteristic for a movement of mobile device 2-1.

In a step 503, one or more second radio signal parameters of the one or more radio signals are obtained at the second position of mobile device 2-1.

Like the first radio signal parameters, the second radio signal parameters may be obtained as scanning results from radio interface 203 when scanning for observable BLE radio signals at the second position of mobile device 2-1 in step 503. In the following, it is assumed that the second radio signal parameters like the first radio signal parameters contain or represent, for each observed BLE radio signal, a respective UUID and a respective received signal strength value.

It is to be understood that, in addition to the one or more BLE radio signals observable at both the first position and the second position, further one or more BLE radio signals may only be observable at the first position or the second position. Accordingly, the radio signal parameters obtained at the first position and the second position may not be limited to the one or more BLE radio signals observable at both the first position and the second position. However, the first radio signal parameters and the second radio signal parameters may be understood to only refer to radio signal parameters of one or more BLE radio signals observable at both the first position and the second position. Therein, a certain BLE radio signal may for example be considered to be observable at both the both the first position and the second position, if the first radio signal parameters and the second radio signal parameters contain or represent a UUID contained in this BLE radio signal.

In a step 504, it is determined, at least partially based on the first radio signal parameters obtained in step 501 and the sensor information obtained in step 502, whether the second radio signal parameters are expected or unexpected for the second position of the mobile device.

That the determining in step 504 is at least partially based on the sensor information obtained in step 502 may for example be understood to mean that the determining is only performed if sensor information indicating a movement of the mobile device are obtained in step 502.

The determining in step 504 may be performed according to predetermined rules (e.g. a predetermined algorithm). The predetermined rules may for example represent at least one of (1) a definition for second radio signal parameters expected for the second position of the mobile device and (2) a definition for second radio signal parameters unexpected for the second position of the mobile device.

The second radio signal parameters of the one or more radio signals may be defined to be unexpected for the second position of the mobile device if the second radio signal parameters represent at least one of (1) an information and (2) a representation of a physical quantity that is not expected to be obtained (e.g. obtained as a scanning result) for the one or more radio signals at the second position. Otherwise, the second radio signal parameters of the one or more radio signals may be defined to be expected for the second position of the mobile device. For example, such a rule or definition may be based on the assumption that certain information (e.g. respective UUIDs) contained in the one or more radio signals does not change and/or that certain physical quantities of the one or more radio signals like the respective received signal strengths may change when the mobile device moves from the first position to the second position.

To give a non-limiting example, the determining in step 504 may comprise:

determining whether the first radio signal parameters and the second radio signal parameters indicate a change of the respective received signal strength of each radio signal of the one or more radio signals between the first position and the second position.

Figure 6A:
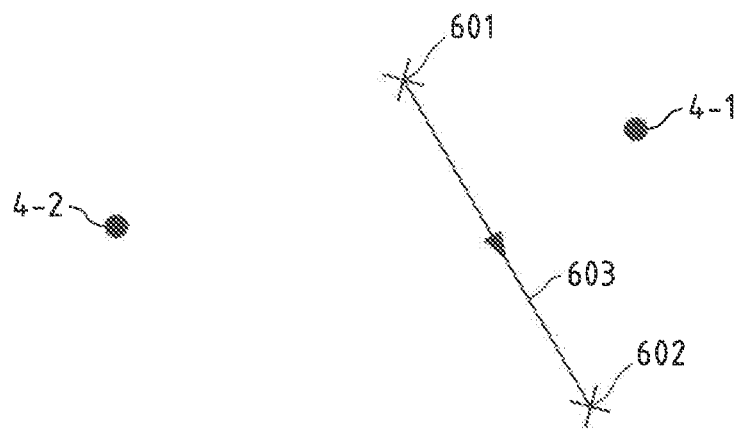
FIGS. 6A, B relate to different exemplary radio signal scenarios.
Figure 6B:
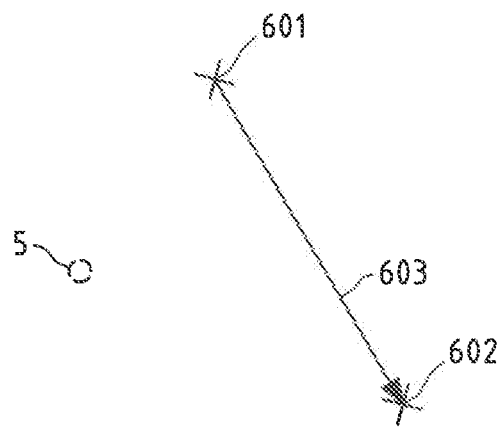

This is explained in the following based on FIG. 6A to 6B which relate to different exemplary BLE radio signal scenarios. In FIG. 6A to 6B, mobile device 2-1 moves from a first position 601 to a second position 602 along a travel path 603.

In the BLE radio signal scenario of FIG. 6A, BLE radio signals transmitted by BLE beacons 4-1, 4-2 and 4-3 are observable at both the first position 601 and the second position 602. Due to path loss, the signal powers of the BLE radio signals transmitted by BLE beacons 4-1, 4-2 and 4-3 are different at the first position 601 and the second position 602. Moreover, the mobile device 2-1 moves away from BLE beacons 4-1 and 4-2 and comes closer to BLE beacon 4-3 when moving from the first position 601 to the second position 602 along travel path 603 such that the signal powers of the BLE radio signals transmitted by BLE beacons 4-1 and 4-2 decrease and the signal power of the BLE radio signal transmitted by BLE beacons 4-3 increases. In other words, the signal power of the BLE radio signals transmitted by BLE beacons 4-1 to 4-3 changes differently.

FIG. 6B relates to a corresponding spoofing scenario where a spoofing radio device 5 transmits the BLE radio signals originally transmitted by BLE beacons 4-1, 4-2 and 4-3 to deceive mobile device 2-1 to cause it to determine (e.g. estimate) its position to be in the overlapping region of the coverage area of BLE beacons 4-1, 4-2 and 4-3. Since the BLE radio signals are transmitted by the same spoofing radio device 5, the signal powers of the spoofed BLE radio signals changes equally when moving from the first position 601 to the second position 602 along travel path 603.

By determining whether the first radio signal parameters and the second radio signal parameters indicate a change of the respective received signal strength of each radio signal of the one or more radio signals between the first position and the second position, it is thus possible to determine whether the second radio signal parameters are unexpected for the second position of the mobile device. Moreover, if the second radio signal parameters are unexpected for the second position of the mobile device, the one or more radio signals and/or the first radio signal parameters and the second radio signal parameters may be considered to be potentially manipulated.

For example, if the first radio signal parameters and the second radio signal parameters do not indicate a change of the respective received signal strength of each radio signal of the one or more radio signals between the first position and the second position, it may be determined in step 504 that the second radio signal parameters are unexpected for the second position of the mobile device. This rule may for example help to identify potentially manipulated radio signal parameters, for example, if a spoofing malware running on mobile device 2-1 manipulates the first radio signal parameters and the second radio signal parameters obtained in steps 501 and 503 (e.g. by replacing them with the same manipulated radio signal parameters).

Moreover, if the one or more radio signals are at least two different radio signals and if the first radio signal parameters and the second radio signal parameters indicate that the respective received signal strength of each radio signal of the at least two radio signals change equally between the first position and the second position, it may be also determined in step 504 that the second radio signal parameters are unexpected for the second position of the mobile device. This rule may for example help to identify potentially manipulated radio signals, for example the spoofed radio signals of the scenario of FIG. 6B may be identified to be potentially manipulated by this rule.

It is to be understood that the orders of the steps of flowchart 500 is only exemplary and that the steps may also have a different order if possible. Furthermore, it is also possible that two or more steps may be performed in one step.

Figure 7:
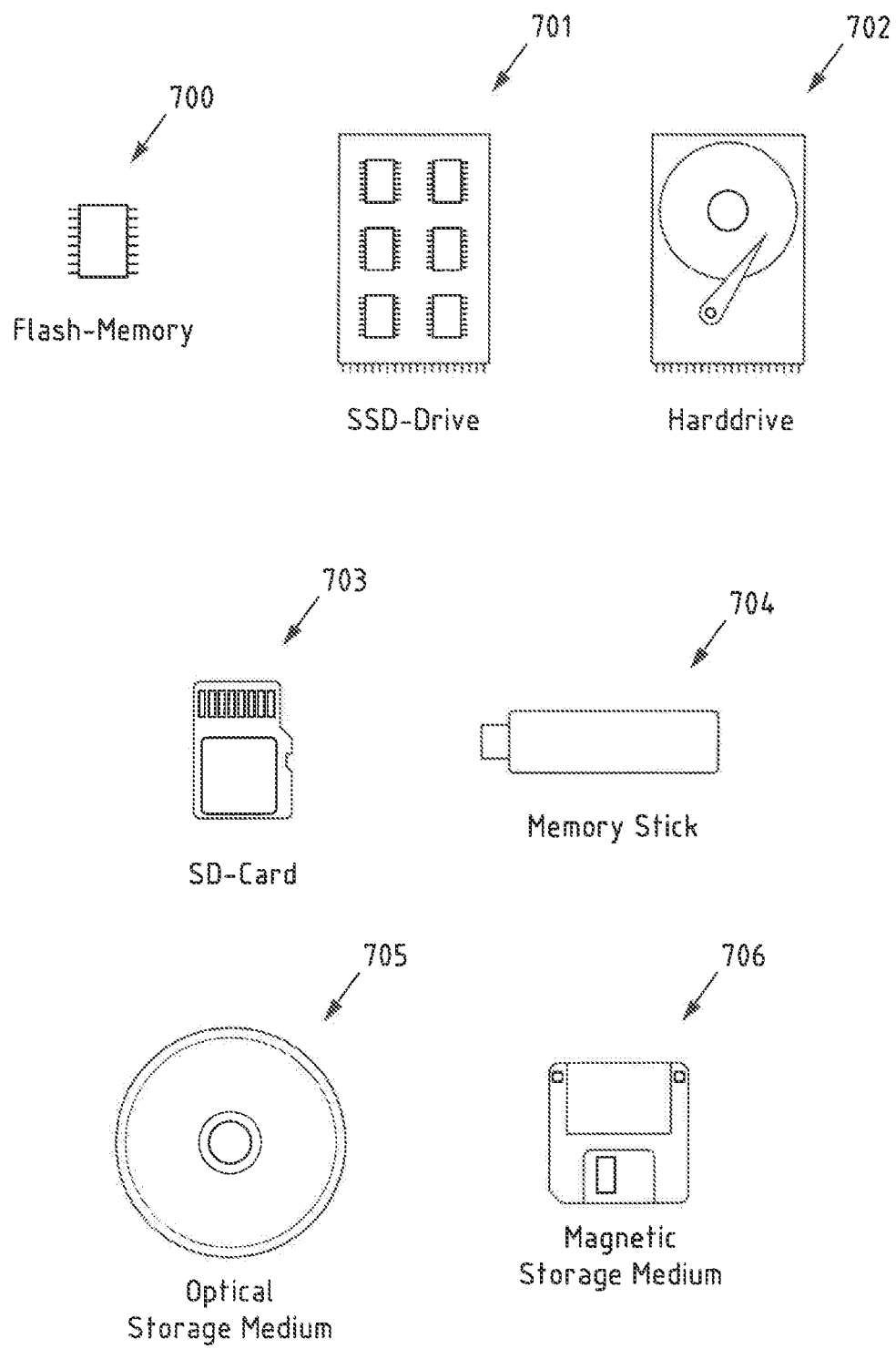
FIG. 7 is a schematic illustration of examples of tangible and non-transitory storage media according to the invention.

FIG. 7 is a schematic illustration of examples of tangible and non-transitory computer-readable storage media according to the present invention that may for instance be used to implement memory 201 of FIG. 2, memory 301 of FIG. 3 and memory(-ies) 401 of FIG. 4. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201, 301 and 401 of FIGS. 2, 3 and 4, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by a mobile device, the method comprising:
    obtaining one or more first radio signal parameters of one or more radio signals at a first position of said mobile device;
    obtaining sensor information indicating a movement of said mobile device from said first position to a second position;
    obtaining one or more second radio signal parameters of said one or more radio signals at said second position of said mobile device;
    determining, at least partially based on said first radio signal parameters and said sensor information, whether said second radio signal parameters are expected or unexpected for said second position of said mobile device, wherein the first radio signal parameters and the second radio signal parameters comprise information contained in the respective radio signal or a combination of information contained in the respective radio signal and at least one physical quantity of the respective radio signal; and
    when it is determined that said second radio signal parameters are unexpected for said second position of said mobile device, identifying at least one of (a) said one or more radio signals, (b) said first radio signal parameters, or (c) said second radio signal parameters as being potentially manipulated.

2. A method according to claim 1, wherein, when it is determined that said second radio signal parameters are unexpected for said second position of said mobile device, the method further comprises:
    identifying or causing of identifying said one or more radio signals as potentially manipulated;
    identifying or causing of identifying of at least one of said first radio signal parameters and said second radio signal parameters as potentially manipulated; and
    rejecting at least one of said first radio signal parameters and said second radio signal parameters for estimating a position of said mobile device; or
    when a position of said mobile device is estimated at least partially based on said first radio signal parameter or said second radio signal parameters, identifying said estimated position as potentially manipulated.

3. A method according to claim 1, wherein, when it is determined that said second radio signal parameters are expected for said second position of said mobile device, the method further comprises:
    estimating or causing of estimating of a position of said mobile device at least partially based on at least one of said first radio signal parameters and said second radio signal parameters; and
    determining or causing of determining a radio map at least partially based on said first radio signal parameters or said second radio signal parameters; or
    when a position of said mobile device is estimated at least partially based on said first radio signal parameters or said second radio signal parameters, identifying or causing of identifying said estimated position as trustworthy.

4. A method according to claim 1, wherein said first radio signal parameters and said second radio signal parameters comprise or represent one or more of the following radio signal parameters:
    an identifier of a radio signal;
    a received signal strength parameter;
    a signal-to-noise ratio parameter; or
    a signal quality parameter.

5. A method according to claim 1, wherein said determining whether said second radio signal parameters are expected or unexpected for said second position of said mobile device comprises:
    determining whether said first radio signal parameters and said second radio signal parameters indicate a change of said one or more radio signals between said first position and said second position.

6. A method according to claim 5, wherein, when said one or more radio signals are at least two different radio signals and said first radio signal parameters and said second radio signal parameters indicate that said at least two radio signals change equally between said first position and said second position, it is determined that said second radio signal parameters are unexpected for said second position of said mobile device.

7. A method according to claim 5, wherein said determining of whether said second radio signal parameters are expected or unexpected for said second position of said mobile device further comprises:
    determining or estimating at least one of a distance between said first position and said second position and a direction of movement from said first position to said second position, and
    determining, at least partially based on said at least one of said distance and said direction of movement, whether said change of said one or more radio signals between said first position and said second position is expected or unexpected.

8. A method according to claim 5, wherein said change of said one or more radio signals between said first position and said second position is an attenuation of said one or more radio signals between said first position and said second position.

9. A method according to claim 8, wherein, when said attenuation of said one or more radio signals between said first position and said second position given in decibels is not proportional to said distance between said first position and said second position with a proportionality coefficient equal to or greater than 1, it is determined that said second radio signal parameters are unexpected for said second position of said mobile device.

10. A method according to claim 1, wherein said determining whether said second radio signal parameters are expected or unexpected for said second position of said mobile device is further based on a radio map.

11. A method according to claim 1, wherein said sensor information are determined by at least one of the following sensors:
    a global navigation satellite system (GNSS) sensor;
    an inertial or motion sensor;
    a shock sensor; or
    an optical sensor.

12. A method according to claim 1, wherein said one or more radio signals comprise one or more of the following radio signals:

a BLUETOOTH radio signal;
a BLUETOOTH Low Energy radio signal;
a wireless local area network (WLAN) radio signal;
a low-power wide-area network (LPWAN) radio signal; or
a cellular radio signal.

13. An apparatus comprising at least one processor and at least one memory including computer program code, the at least one memory and the computer program code configured to, with the at least one processor, cause said apparatus at least to:
obtain one or more first radio signal parameters of one or more radio signals at a first position of said mobile device;
obtain sensor information indicating a movement of said mobile device from said first position to a second position;
obtain one or more second radio signal parameters of said one or more radio signals at said second position of said mobile device;
determine, at least partially based on said first radio signal parameters and said sensor information, whether said second radio signal parameters are expected or unexpected for said second position of said mobile device, wherein the first radio signal parameters and the second radio signal parameters comprise information contained in the respective radio signal or a combination of information contained in the respective radio signal and at least one physical quantity of the respective radio signal; and
when it is determined that said second radio signal parameters are unexpected for said second position of said mobile device, identify at least one of (a) said one or more radio signals, (b) said first radio signal parameters, or (c) said second radio signal parameters as being potentially manipulated.

14. An apparatus according to claim 13, wherein the at least one memory and the computer program code are configured to, with the at least one processor, cause said apparatus to determine whether said second radio signal parameters are expected or unexpected for said second position of said mobile device by determining whether said first radio signal parameters and said second radio signal parameters indicate a change of said one or more radio signals between said first position and said second position.

15. An apparatus according to claim 14, wherein, when said one or more radio signals are at least two different radio signals and said first radio signal parameters and said second radio signal parameters indicate that said at least two radio signals change equally between said first position and said second position, the at least one memory and the computer program code are configured to, with the at least one processor, cause said apparatus to determine that said second radio signal parameters are unexpected for said second position of said mobile device.

16. An apparatus according to claim 14, wherein the at least one memory and the computer program code are configured to, with the at least one processor, cause said apparatus to determine whether said second radio signal parameters are expected or unexpected for said second position of said mobile device by:
determining or estimating at least one of a distance between said first position and said second position and a direction of movement from said first position to said second position, and
determining, at least partially based on said at least one of said distance and said direction of movement, whether said change of said one or more radio signals between said first position and said second position is expected or unexpected.

17. An apparatus according to claim 14, wherein said change of said one or more radio signals between said first position and said second position is an attenuation of said one or more radio signals between said first position and said second position.

18. An apparatus according to claim 17 wherein, when said attenuation of said one or more radio signals between said first position and said second position given in decibels is not proportional to said distance between said first position and said second position with a proportionality coefficient equal to or greater than 1, the at least one memory and the computer program code are configured to, with the at least one processor, cause said apparatus to determine that said second radio signal parameters are unexpected for said second position of said mobile device.

19. A non-transitory computer-readable storage medium storing computer program code that is configured, upon execution by a processor of an apparatus, to cause the apparatus to:
obtain one or more first radio signal parameters of one or more radio signals at a first position of said mobile device;
obtain sensor information indicating a movement of said mobile device from said first position to a second position;
obtain one or more second radio signal parameters of said one or more radio signals at said second position of said mobile device; and
determine, at least partially based on said first radio signal parameters and said sensor information, whether said second radio signal parameters are expected or unexpected for said second position of said mobile device, wherein the first radio signal parameters and the second radio signal parameters comprise information contained in the respective radio signal or a combination of information contained in the respective radio signal and at least one physical quantity of the respective radio signal; and
when it is determined that said second radio signal parameters are unexpected for said second position of said mobile device, identify at least one of (a) said one or more radio signals, (b) said first radio signal parameters, or (c) said second radio signal parameters as being potentially manipulated.

20. An apparatus according to claim 13, wherein the at least one memory and the computer program code are configured to, with the at least one processor, when it is determined that said second radio signal parameters are expected for said second position of said mobile device, cause said apparatus to:
estimate or cause estimating of a position of said mobile device at least partially based on at least one of said first radio signal parameters and said second radio signal parameters; and
determine or cause determining a radio map at least partially based on said first radio signal parameters or said second radio signal parameters; or
when a position of said mobile device is estimated at least partially based on said first radio signal parameters or said second radio signal parameters, identify or cause identifying said estimated position as trustworthy.

* * * * *